May 7, 1963    H. TANNER    3,088,352
PIPE CUTTING DEVICE
Filed April 6, 1960    3 Sheets-Sheet 1
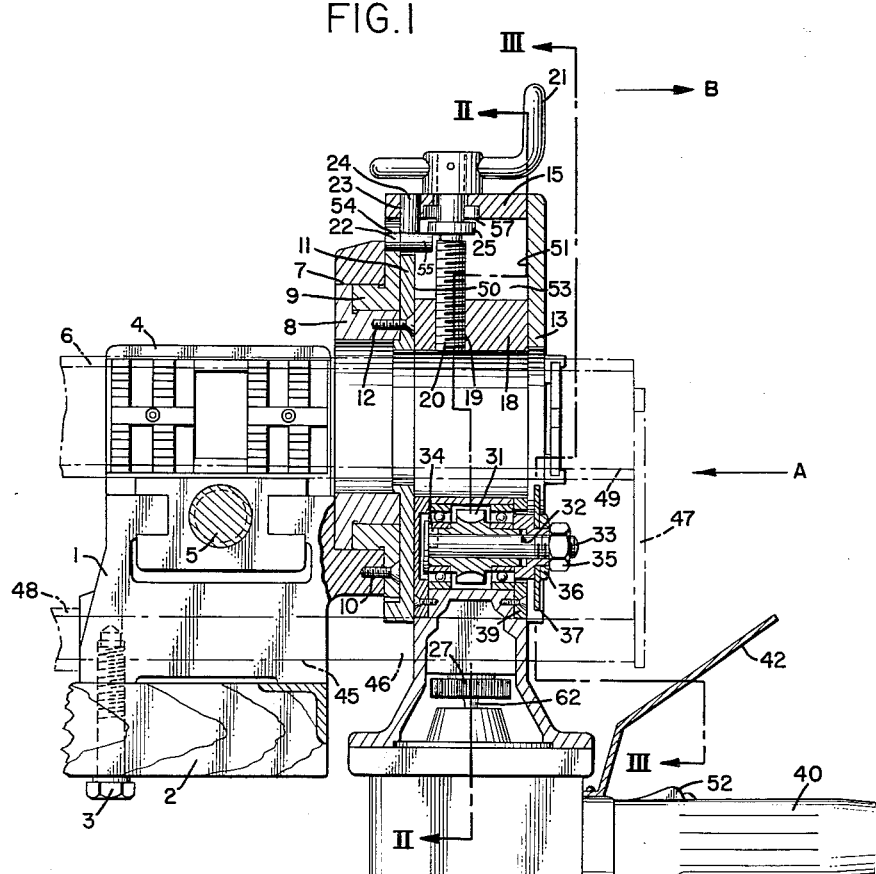
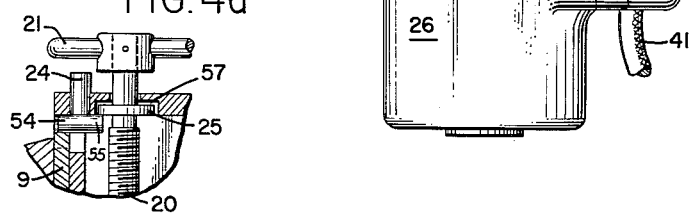
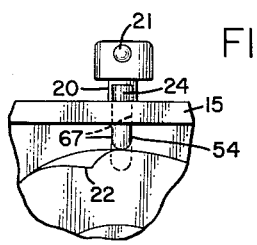
INVENTOR
HANS TANNER
BY
Patent Agent May 7, 1963 H. TANNER 3,088,352
PIPE CUTTING DEVICE
Filed April 6, 1960 3 Sheets-Sheet 2

INVENTOR
HANS TAMMER

May 7, 1963 H. TANNER 3,088,352
PIPE CUTTING DEVICE
Filed April 6, 1960 3 Sheets-Sheet 3
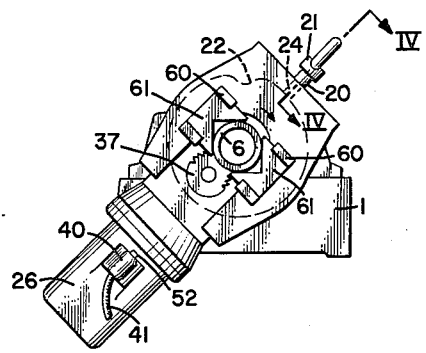
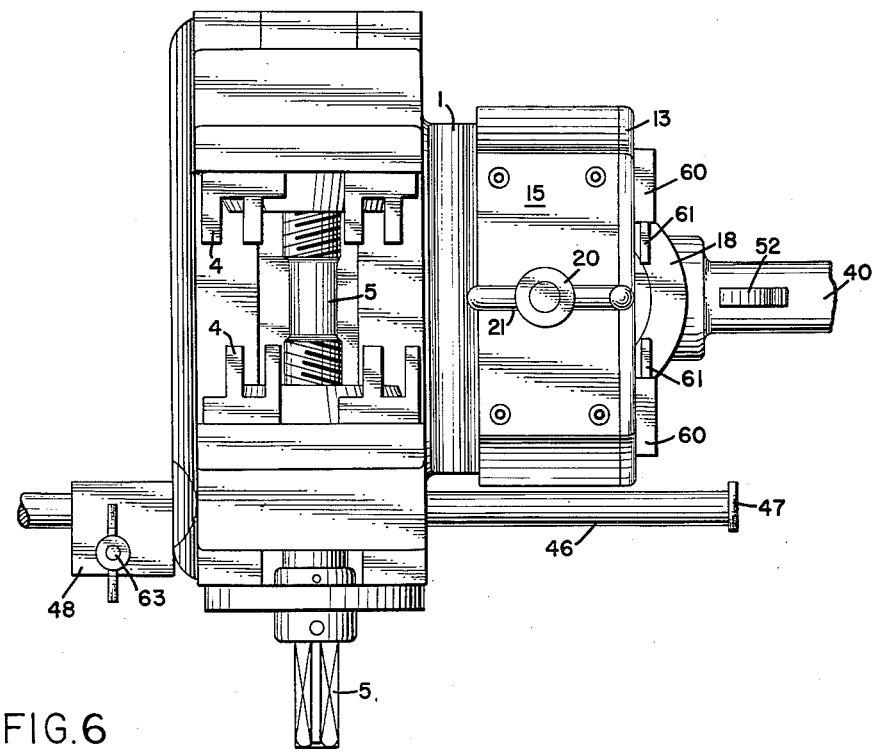
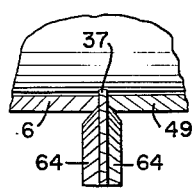
INVENTOR
HANS TANNER
BY
Patent Agent.

3,088,352
PIPE CUTTING DEVICE
Hans Tanner, Schaffhausen, Switzerland, assignor to Georg Fischer Aktiengesellschaft, Schaffhausen, Switzerland
Filed Apr. 6, 1960, Ser. No. 20,470
Claims priority, application Switzerland Apr. 7, 1959
9 Claims. (Cl. 82—59)

The present invention relates to a pipe cutting device, especially for installation purposes, which comprises a stationary work piece clamping device and a motor driven cutting tool which is radially guided by a cutter head adapted manually to be moved around the work piece.

Pipe cutting devices with counter rollers and a motor driven spring-biased cutting tool are known in which the cutting tool is designated as circular saw. Such cutting devices are actually placed upon the pipe to be cut which is clamped into a corresponding clamping device and during the cutting operation is moved manually around the pipe. The feeding of the cutting tool in conformity with the required cutting depth has to be effected manually at the start of the working operation.

There is furthermore known a cutting device with a stationary work piece clamping station and a motor driven cutter head moving around the pipe to be cut, in which one or a plurality of cut-off tools are displaceable in radial direction. Such devices have the drawback that the cutting tool which comprises only one cutting edge has to rotate a plurality of times around the pipe so that in the interior of the pipe considerable burr is formed which latter then has to be removed by a further working operation.

It is, therefore, an object of the present invention to provide a pipe cutting device which will overcome the above mentioned drawbacks.

It is another object of this invention to provide a pipe cutting device which will not cause the formation of any material burr on the inner surface of the pipe.

It is still a further object of this invention to provide a pipe cutting device as set forth in the preceding paragraphs, which will at the same time prevent any chip accumulation on the cutter while simultaneously causing a cooling effect thereon.

These and other objects and advantages of the invention will appear more clearly from the following specification in connection with the accompanying drawings, in which:

FIG. 1 is a partial longitudinal section through a cutting device according to the invention, as taken along the line I—I of FIG. 3.

FIG. 4 represents on a larger scale than that of FIGS. 1 to 3 a front view of the cutting device according to the invention in working position, said front view being seen in the direction of the arrow A of FIG. 1.

FIG. 4a illustrates a partial section taken along the line IV—IV of FIG. 4 at a larger scale than FIG. 4.

FIG. 4b represents a partial rear view of the cutting device in working position, seen in the direction of arrow B of FIG. 4a.

FIG. 5 is a top view of the device according to the invention without a pipe to be cut.

FIG. 6 illustrates a chamfing tool adapted to be mounted on the shaft of the cutting tool.

*General Arrangement*

Figure 2:
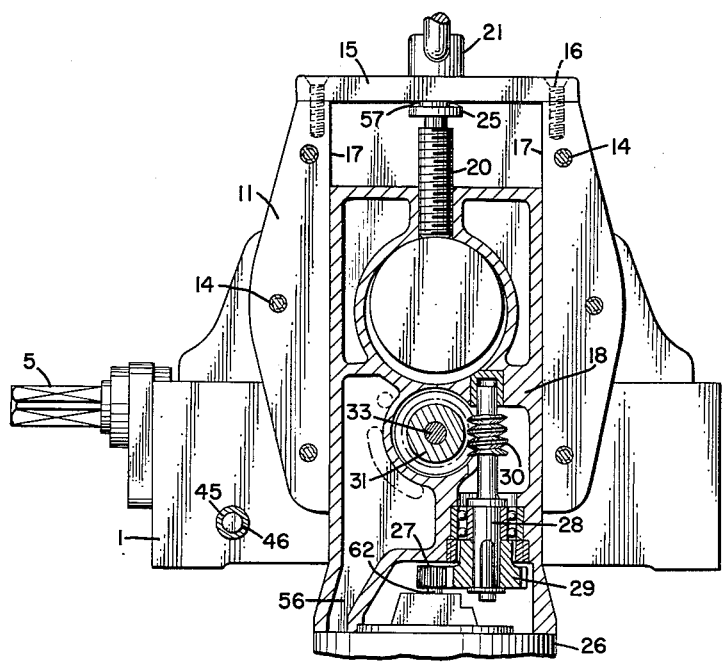
FIG. 2 represents a section taken along the line II—II of FIG. 1.

The pipe cutting device according to the present invention is characterized primarily in that the cutting head is designed as a rotatable body rotatably journalled in a flanged bushing of the housing of the device and provided with guiding means for a radially displaceable work tool carriage. Furthermore, in conformity with the present invention, the housing has firmly connected thereto a guiding bushing which, when turning the rotatable body, through the intervention of a slide shoe and a threaded spindle, controls the displacement and feeding movements of the tool carriage and holds the cutting tool during the cutting operation in its respective adjusted position.

*Structural Arrangement*

Referring now to the drawings in detail, the device shown therein comprises a housing 1 connected to the top of a work bench 2 by means of screws 3.

Displaceably mounted on housing 1 by means of a threaded spindle 5 are clamping jaws 4 as they are customarily used in connection with vises for pipes in order firmly to clamp therebetween the pipe 6 to be cut.

Housing 1 is provided with a bore 7 in which a flanged bushing 8 is rotatably journalled. The housing 1 is furthermore provided with a guiding bushing 9 fastened to the housing 1 by screws 10 and serving as an abutment against axial displacement. A rotatable body 11 is by means of screws 12 connected to the flanged bushing 8. The right-hand side (with regard to FIG. 1) of the rotatable body 11 is formed by a cover plate 13 connected to the rotatable body 11 by means of screws 14 (FIG. 3), whereas the upper end of the device is formed by a cover plate 15 connected to the rotatable body 11 by means of screws 16 (FIG. 2).

A sliding surface 50 (FIG. 1), two lateral guiding surfaces 17 (FIG. 2) in the rotatable body 11, and an inner surface 51 of the cover plate 13 confine a chamber 53 in which a carriage 18 is easily displaceable radial to the axis of a pipe to be cut. The upper portion of carriage 18 is provided with an interior thread 19 engaged by a correspondingly threaded spindle 20 which is provided with a crank 21 and is guided with axial play in cover plate 15. The threaded spindle 20 is provided with a collar 25 upon which is loosely mounted a plate spring 57.

The uppermost portion of guiding bushing 9 fixedly connected to housing 1 is provided with a cut-out 22 adapted to be engaged by one arm 54 of a T-shaped sliding shoe 24 adapted to be longitudinally displaced in a bore 23 of plate 15 parallel to the threaded spindle 20. The oppositely located arm 55 engages the bottom side of the collar 25 of threaded spindle 20. The sliding shoe 24 with its T-shaped arms 54 and 55 is guided and secured against rotation in a slot 67 of the rotatable body 11.

The sliding shoe 24 with its arms 54 and 55, as shown in FIG. 4b, is secured against rotation relative to rotatable body 11 by means of a slot 67 in the rotatable body 11. The dimensions of arm 54 are selected so that during the sliding operation of shoe 24, the lower portion of the latter will engage the cylindrical portion of the circumference of the cam disc 9, whereas the upper portion of arm 54 will approximately engage lid 15. In other words, this distance corresponds to the fixed depth of penetration of tool 37, and this depth will, with each cutting operation, always remain the same regardless whether a pipe with a thick wall or a thin wall is involved. This distance also corresponds to the depth of the recess in lid 15 for the collar 25 of the threaded spindle 20 and to the depth of the recess 22 in the cam disc 9 (measured in radial direction).

As shown in FIG. 4a, a dish-shaped spring 47 is provided which serves for compensating the tolerances obtained during the production.

The lower end (with regard to FIG. 1) of carriage 18 carries a drive motor 26 with a motor shaft 62. Shaft 62 has rotatably connected thereto a pinion 27 (FIG. 2) which meshes with a gear 29 mounted on a worm shaft 28 journalled in the carriage 18. Worm 30 of the worm shaft 28 meshes with a worm wheel 31 provided with a bore 32 (FIG. 1) for receiving an easibly removable clamping screw 33 which is normally prevented from rotation by a stud 34.

The circular saw 37 serving as cutting tool may be connected to the worm wheel 31 by means of a clamping disc 36, a nut 35 and clamping screw 33.

Figure 3:
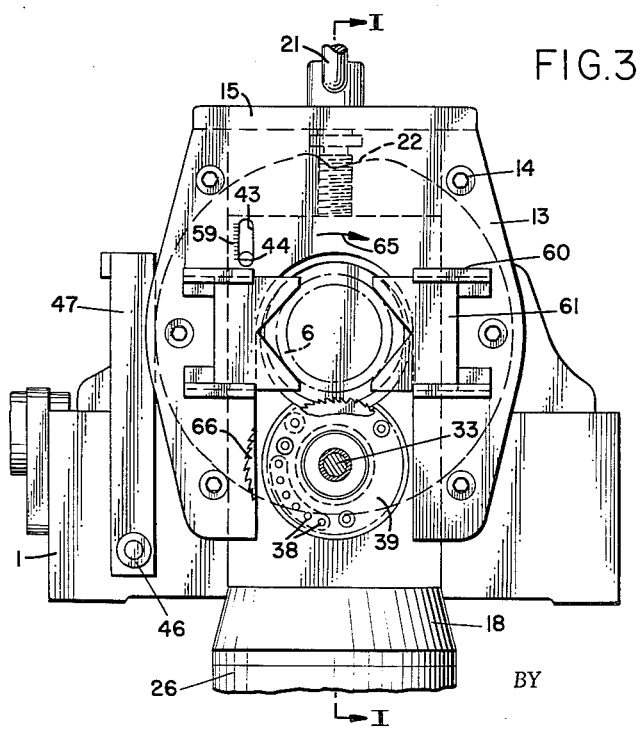
FIG. 3 illustrates a section taken along the line III—III of FIG. 1.

Behind and slightly axially spaced from the circular saw 37 there is provided in carriage 18 a bearing cover 39 having a plurality bores 38 (FIG. 3). The drive motor 26 takes in from below (with regard to FIG. 1) fresh air which will then be forced by the ventilating effect of motor 26 through an air passage 56 (FIG. 2) in carriage 18 to the bores 38 and thereby against the circular saw 37. In this way, the chips produced during the working operation are being continuously blown off, while at the same time the air flow contributes to the cooling of the circular saw.

A cable for conveying the current to a plug 40 with switch 52 of motor 26 is designated with the reference numeral 41, whereas the reference numeral 42 designates a protective shield for protecting the operator against chips.

Carriage 18 with motor 26 and circular saw 37 may, if necessary, be moved downwardly by turning the crank 21 so that eventually the threaded spindle 20 will move out of the inner thread 19. In order during such an operation to prevent the carriage 18 from accidentally dropping out, the cover plate 13 is provided with a limiting slot 43 (FIG. 3). Said slot is engaged by an abutment screw 44 connected to slide 18 which will limit the movement of slide 18 in either direction. Adjacent the limiting slot 43 there may be provided a scale 59 for facilitating the adjustment of the displacement stroke of carriage 18 in the rotatable body 11 when it is intended to cut a pipe. The said adjustment will be effected by rotating crank 21 of spindle 20.

Provided in housing 1 is a bore 45 (FIG. 2) which is parallel to the axis of rotation of the circular saw 37 and has longitudinally displaceably mounted therein an abutment shaft 46 (FIG. 5) with an abutment lever 47. The length of a pipe section 49 to be cut off is adjusted by a clamping element 48 (FIG. 1) which is adjustably mounted on abutment shaft 46 and can be arrested thereon at any desired point by means of a clamping screw 63.

The front side of cover plate 13 is provided with guiding means 60 (FIGS. 3, 4 and 5) having radially displaceably mounted therein two clamping jaws 61.

Instead of the circular saw 37, also other cutting discs or cutter elements may be employed. Inasmuch as rather frequently pipe sections have to be cut off from a pipe which subsequently are to be welded to other pipe sections, it may be advantageous to chamfer the cutting surfaces either at the pipe section 49 only or at pipe 6 itself or at the outside of both sections. In such instances, it is possible on one or both sides of the cutting tool 37, to connect chamfering tools 64 designed as cutters to the clamping screw 33 by means of a nut 35 as shown for instance in FIG. 6. Cast onto the cover plate 13 are teeth 66 (FIG. 3). These teeth indicate how the cutting tools have to be employed. An arrow 65 likewise cast onto the device indicates the direction in which the device has to be turned about the firmly clamped pipe 6.

*Operation*

It may be assumed that for instance a number of pipe sections 49 of equal length are to be cut off from a pipe 6. To effect such cutting operation, the pipe 6 is first clamped at the desired place by the clamping jaws 4 in cooperation with spindle 5. The abutment lever 47 is then moved so as to engage the adjacent end surface of the pipe section 49 to be cut off, and the clamping member 48 is firmly clamped on the abutment shaft 46 in order to assure that all further pipe sections to be cut off will have the same length. The desired pipe length may be adjusted by means of measuring tools with abutment against circular saw 37 on one hand and abutment 47 on the other hand.

Thereupon, the abutment lever 47 with the abutment shaft 46 is turned toward the left with regard to FIG. 3 and afterwards pushed to the left with regard to FIG. 1 until it engages housing 1. Due to the weight of slide 18 with motor 26, the slide 18 will move downwardly inasmuch as it is easily displaceable in the body 11. Slide 18 will move downawrdly into the position shown in FIG. 1 in which arm 54 of the slide shoe 24 rests in a notch or cut-out 22 of the guiding bushing 9. The outer diameter of the circular saw 37 will then have a certain distance from the outer diameter of pipe 6. This distance may be varied in conformity with the diameter of pipe 6 to be cut off. Such variation will be effected by means of crank handle 21 on threaded spindle 20.

During the cutting operation proper, handle 40 is grasped, switch 52 actuated and the rotary body 11 rotatably mounted in housing 1 is, as shown in FIG. 4, with all parts pertaining thereto first slowly moved until the desired cutting depth is obtained and is then quickly moved, depending on the thickness and strength of the material to be cut, by hand in clockwise direction around pipe 6 as indicated by arrow 65 (FIG. 3) until slide shoe 24, after a turning movement of about 360°, again slides into the notch 22 of the guiding bushing 9. When turning arm 54 of slide shoe 24, arm 54 will move out of the notch 22 onto the circular contour of the guiding bushing 9. As a result thereof, arm 55 pertaining to slide shoe 24 and engaging the bottom side of collar 25 lifts threaded spindle 20 with crank handle 21 and thus also slide 18 into the position shown in FIG. 4 and in detail in the FIGS. 4a and 4b while plate spring 57 serves for play-free support of collar 25 with ground plate 15.

The circular saw 37 journalled in slide 18 and rotating in counter-clockwise direction will likewise be lifted and enter pipe 6 where the circular saw will remain during the further cutting operation. With increasing manual turning movement of the rotary body 11, the cutting off of the pipe section 49 will be effected from the inside toward the outside so that no burr will be formed on the inner side of the pipe. The blower air of the driving motor 26 which escapes through bores 38 of the bearing lid 39 will continuously blow away the produced chips so that they will not impede the proper working of the machine. At the same time, the said blower air also cools the circular saw 37.

Inasmuch as the pipe cutting device according to the invention is intended primarily for assembly and installation purposes, the driving motor 26 is preferably designed as D.C. and A.C. 2-phase or 3-phase motor.

It is, of course, to be understood, that the present invention is, by no means, limited to the particular constructions shown in the drawings but also comprises any modifications within the scope of the appended claims.

What I claim is:

1. A cutting device for cylindrical objects such as pipe which comprises: a stationary housing, work piece gripping means carried by the housing, a cutter head rotatably supported on said housing, a tool carriage slidably mounted in said rotary body and guided therein for movement in a direction perpendicular to the axis of a work piece gripped by said work piece gripping means, said tool carriage being adapted for supporting a cutting tool, a guiding means in the form of a cam fixed to said housing and having a peripheral surface concentric with the axis of a work piece gripped in said gripping means and also having a peripheral notch, control means carried by said rotary body movable therein in the direction of movement of the tool carriage therein and comprising means engaging the periphery of said cam and also including means operatively engaging said tool carriage so that as the cutter head is rotated on the housing the tool carriage will be moved therein in conformity with the configuration of said cam.

2. A cutting device according to claim 1, in which said control means engages the tool carriage at a point on the opposite side of the work piece from a cutting tool carried by the tool carriage, and wherein the said point of engagement of the control means with the tool carriage is adjustable with respect to its distance from the cutting tool thereby to vary the depth of cut of the cutting tool.

3. A pipe cutting device which comprises: a stationary housing, work piece holding means on said housing, a rotary body rotatably journalled in said housing and being provided with first guiding means, a tool carriage supported by said rotary body and being radially slidably guided with regard thereto in said first guiding means and adapted for receiving and supporting a cutting tool, second guiding means fixedly connected to said housing, and control means movably carried by said rotary body and slidably engaging said second guiding means and also engaging said tool carriage, said control means being operable by said second guiding means in response to rotation of said rotary body and in conformity with the contour of said second guiding means for displacing said tool carriage from retracted idle position into cutting position during rotary movement of said rotary body for a cutting operation.

4. A pipe cutting device which comprises: a stationary housing, work piece holding means on said housing, a rotary body rotatably journalled in said housing and provided with first guiding means, a tool carriage supported by said rotary body and radially slidably guided with regard thereto in said first guiding means and adapted for receiving and supporting a cutting tool, second guiding means fixedly connected to said housing and having a substantially circular contour with a peripheral notch means therein, and slide shoe means slidably supported by said rotary body and slidably engaging said second guiding means and also engaging said tool carriage, said slide shoe means normally engaging said notch means and being movable out of said notch means in response to a rotative movement of said rotary body, said slide shoe means being operable in response to the movement thereof out of said notch means by rotation of said rotary body to displace said tool carriage so as to move the same out of retracted idle position into cutting position and to hold said carriage in cutting position during rotation of said rotary body for a cutting operation.

5. An arrangement according to claim 3, which includes a cutting tool supported by said carriage and also includes tool means mounted on said carriage and drivingly connected to said cutting tool.

6. A pipe cutting device which comprises: a stationary housing, work piece holding means on said housing, a rotary body rotatably journalled in said housing and provided with first guiding means, a tool carriage supported by said rotary body and radially slidably guided with regard thereto in said first guiding means and adapted for receiving and supporting a cutting tool, second guiding means fixedly connected to said housing and having a substantially circular contour with a peripheral notch means therein, slide shoe means slidably supported by said rotary body and slidably engaging said second guiding means and also engaging said tool carriage, said slide shoe means normally engaging said notch means and being movable out of said notch means in response to a rotative movement of said rotary body, said slide shoe means being operable in response to the movement out of said notch means to displace said carriage in said rotary body so as to move the tool carriage into and to hold said carriage in cutting position during rotation of said rotary body for cutting operation, a cutting tool carrier supported by said carriage, motor means likewise supported by said carriage, and a drive train including gear means drivingly interconnecting said motor means and said tool carriage for driving the latter.

7. A pipe cutting device which comprises: a stationary housing, work piece holding means on said housing, a rotary body rotatably journalled in said housing and provided with first guiding means, a tool carriage supported by said rotary body and radially slidably guided with regard thereto in said first guiding means and adapted for receiving and supporting a cutting tool, adjusting means connected between the rotary body and said tool carriage and operable for adjusting said tool carriage in a direction perpendicular to the axis of the pipe to be cut when mounted in said work piece holding means for determining the depth of penetration of a cutting tool carried by said tool carriage into the pipe to be cut, second guiding means fixedly connected to said housing, and control means carried by said rotary body and slidably engaging said second guiding means and also engaging said adjusting means, said control means being operable by said second guiding means in conformity with the contour thereof for displacing said tool carriage in said rotary body to move said carriage into and hold said carriage in cutting position during rotation of said rotary body for a cutting operation.

8. A pipe cutting device which comprises: a stationary housing, work piece holding means on said housing, a rotary body rotatably journalled in said housing and provided with first guiding means extending radially with respect to the axis of rotation of said rotary body, a tool carriage supported by said rotary body and radially slidably guided with regard thereto in said first guiding means, a cutting tool supported by said tool carriage, motor means supported by said tool carriage and drivingly connected to said cutting tool, passage means provided in said tool carriage and leading from said motor means to said cutting tool for conveying ventilating air from said motor means to said cutting tool, second guiding means fixedly connected to said housing and being generally circular with its center on the axis of rotation of said rotary body, and control means reciprocably carried by said rotary body and slidably engaging said second guiding means and also engaging said tool carriage, said control means being operable by said second guiding means in conformity with the contour thereof for displacing said tool carriage to move the same into and hold said carriage in cutting position during rotation of said rotary body for a cutting operation.

9. A pipe cutting device which comprises: a stationary housing, work piece holding means on said housing, a rotary body rotatably journalled in said housing and provided with first guiding means extending radially with respect to the axis of rotation of said rotary body, a tool carriage supported by said rotary body and radially slidably guided with regard thereto in said first guiding means, main cutting means supported by said carriage, auxiliary profile cutting means arranged at least on one side of said main cutting means, said main cutting means and said auxiliary profile cutting means being operable simultaneously to enter into a pipe to be cut which is carried by said housing, second guiding means fixedly connected to said housing, and control means reciprocably carried by said rotary body and slidably engaging said second guiding means and also engaging said tool carriage, said control means being operable by said second guiding means in conformity with the contour thereof for displacing said tool carriage to move the same into and hold said carriage in cutting position during rotation of said rotary body for a cutting operation.

(References on following page)

References Cited in the file of this patent

UNITED STATES PATENTS

| | | |
|---|---|---|
| 143,273 | Chase | Sept. 30, 1873 |
| 368,178 | Whitmore | Aug. 9, 1887 |
| 731,257 | Wilson | June 16, 1903 |
| 1,332,912 | Mitchell | Mar. 9, 1920 |
| 1,570,726 | Broderick | Jan. 26, 1926 |
| 2,159,287 | Morgan | May 23, 1939 |
| 2,377,271 | Schumann | May 29, 1945 |
| 2,393,463 | Gottlieb | Jan. 22, 1946 |
| 2,561,484 | Shaw | July 24, 1951 |
| 2,842,238 | Shaw | July 8, 1958 |

FOREIGN PATENTS

| | | |
|---|---|---|
| 735,185 | Germany | May 7, 1943 |
| 691,064 | Great Britain | May 6, 1953 |